Figure 4:
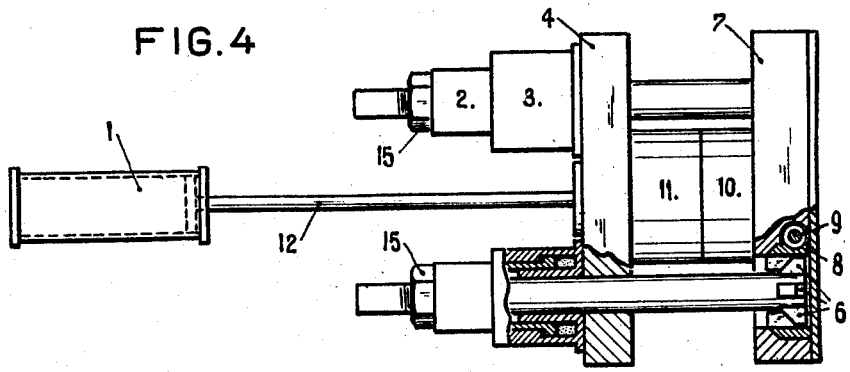

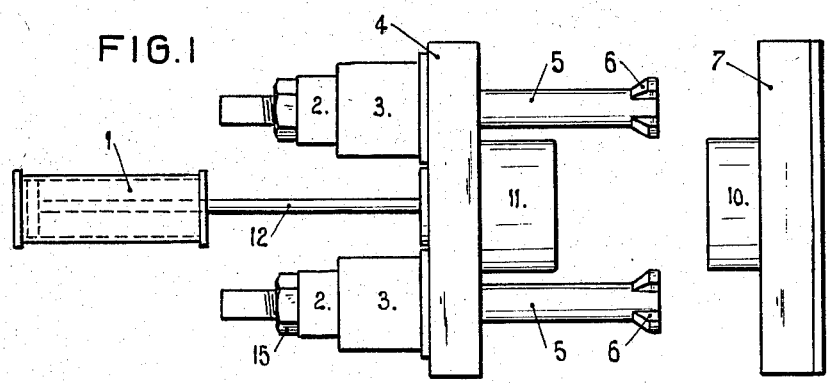
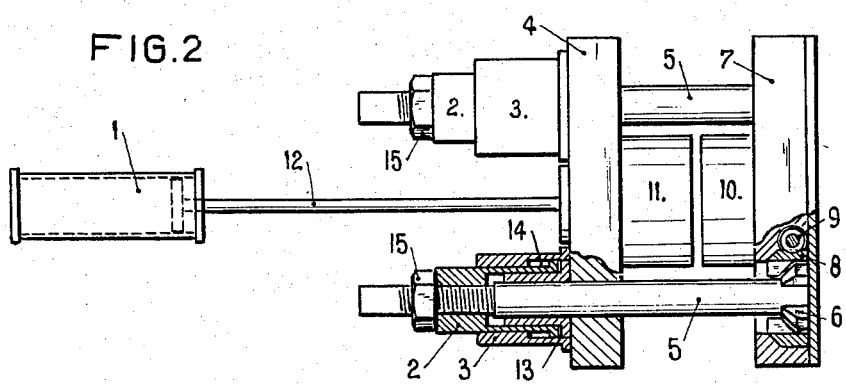
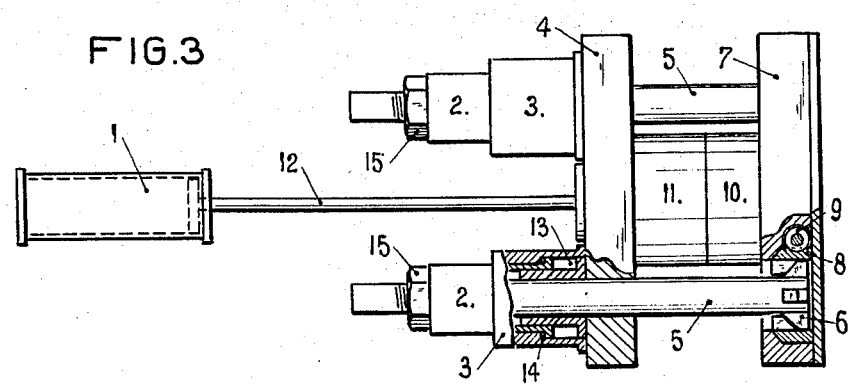

United States Patent Office 2,916,768
Patented Dec. 15, 1959

2,916,768

LOCKING DEVICE FOR INJECTION MOLDING MACHINES

Hendrik K. Quéré and Bartholomeus J. Helders, Vaassen, Netherlands, assignors to N. V. "Industrie" V. H. v. Lohuizen & Co., Vaassen, Netherlands Application March 16, 1956, Serial No. 572,044

Claims priority, application Netherlands March 19, 1955

4 Claims. (Cl. 18—30)

The invention relates to a die casting machine or a high pressure injection molding device provided with a preferably hydraulic pressure mechanism for drawing the mold sections together, one of said mold sections being slidable with respect to the other and the pressure mechanism, engaging on the one side the slidable mold section and on the other side coupling rods carried by the other mold section, intermediate coupling members being provided which, on closing or opening the mold sections, effect the respective coupling and uncoupling between the pressure mechanism and the other mold section. A machine of this kind is known from the U.S. Patent No. 2,526,918. This machine shows, as compared with a die casting machine of having no disconnectable coupling rods between the mold sections and the pressure mechanism, such as is known e.g. from the German Patent No. 493,855, the advantage that, when the mold sections are in opened position, a better accessibility of the space between the mold sections with a view to the releasing of the castings and replacing the mold sections is obtained. The known machine presents, however, the drawback that the coupling members are, during the coupling operation, exposed to a high load by the pressure mechanism, which might cause increased wear. In view of the required exactness in the operation of die casting machines such a wear is, however, inadmissible. The object of the present invention is to provide an improved die casting machine as far as this point is concerned.

The die casting machine according to the invention is characterised in that the coupling members, during coupling or uncoupling of the pressure mechanism and the other mold sections, are actuated by separate driving means. As, according to the invention, the functions of the coupling of the mold sections by the coupling rods on the one side and the pressing against each other of the mold sections on the other side are allotted to different mechanisms, it is possible to first effect the coupling entirely in unloaded condition of the coupling members and only then to press the mold sections against each other by the pressure mechanism under high pressure in view of the casting and the injection under high pressure of the molten material, especially metal. In this manner a machine is obtained the coupling members of which will not show any sign of wear even after having been in use for a considerable time, in contradistinction to what is the case with the above-mentioned die casting machine having disconnectable coupling rods.

With a preferred embodiment of the machine according to the invention the coupling members consist of clutching claws carried by the free end of each coupling rod, said clutching claws cooperating with coupling sleeves provided with clutching claws and carried by the other mold section, said coupling sleeves and coupling rods being adapted to rotate with respect to each other by means of the driving mechanisms.

A further object of the invention is to provide new constructional possibilities as regards the pressure mechanism. With the known machine described in the German Patent No. 493,855 the drawing together of the mold sections, which evidently requires a small stroke and a great force, as well as the reciprocating movement of the slidable mold sections from the opened to the closed position and vice versa which requires a great stroke and little force, is effected by the same hydraulic pressure machine. The invention creates, by the disconnectable coupling bars, the possibility to separate these very different functions, which leads to important constructional advantages.

According to the invention the movements for opening and closing the mold sections are effected by means of a driving mechanism, preferably a hydraulic cylinder, the driving rod of which engages one of the mold sections, whilst the drawing together and, if necessary, the initiation of the opening of the mold sections is effected by a number of preferably hydraulic pressure cylinders, each of which belonging to a coupling rod. It will be obvious that this measure will result in considerable constructive savings. Instead of one cylinder having a long stroke and adapted to supply a high pressure, as is the case with the known machine, with the machine according to the invention one cylinder having a long stroke and adapted to supply a low pressure, as well as a number of cylinders having a very short stroke and adapted to supply a high pressure can be used.

It may be remarked that the driving rod of the driving mechanism is adapted to engage with a great stroke the mold section which is slidable with respect to the coupling rods, so that the other mold section can be made stationary. However, it is also possible to cause the said driving rod to engage the other mold section, so that the construction becomes such that the coupling rods can be made stationary.

As an important advantage of the above-mentioned construction of the machine according to the invention as compared with the known machine may be referred to the fact that a relatively short portion of each coupling rod is, while pressure is being exerted on the mold sections, loaded under strain of tension, in contradistinction to what is the case with the known machine, in which the coupling rods are loaded under strain of tension over their full length, which in this case is also determined by the desired distance between the mold sections when the machine is in opened state; this gives, of course, rise to a greater total deformation.

Another important advantage of the invention consists in this that, when pressure is being exerted on the mold sections, different pressures can be supplied to the working spaces of the pressure cylinders belonging to the coupling rods. This possibility is related to the shape of the casting and its position with respect to the mold sections. In dependence upon these factors it may, namely, be favorable to draw certain parts of the slidable mold section stronger than other points against the stationary mold section, a.o. in view of the burr occurring along the edge of the casting during the injection of the liquid metal. This favorable effect may also be achieved in another way, namely by supplying equal pressures to the working spaces of the pressure cylinders belonging to the coupling rods and by adapting the operative lengths of the coupling rods to the casting to be pressed by providing the coupling rods with differently adjusted stops.

Supplying even quantities of hydraulic liquid to the working spaces of the pressure cylinders belonging to the coupling rods presents advantages on the initiation of the opening of the mold sections, namely to ensure that the mold sections be always separated from each other in the correct mutual position.

In a preferred embodiment of the machine according to the invention the pressure cylinder of each coupling rod is formed by a sleeve which is applied concentrically to the coupling rod and is rigidly attached to the slidable mold section, which sleeve, together with a sleeve that is rigidly secured to the coupling rod but preferably adjustably connected therewith by means of a screwthread, encloses a hydraulic working space for exerting pressure on the mold sections and a hydraulic working space for initiating the opening of the mold sections.

The invention will now be elucidated with reference to an embodiment represented in the drawing.

Figures 1–6 show the essential parts of the die casting machine according to the invention in different positions occurring during operation to be further discussed below.

In the drawing the numeral 10 indicates the fixed and 11 the slidable mold section, between which mold sections the casting is injected while the mold sections are in a locked state. The injecting mechanism, the construction of which is not essential for the present invention and may be carried out in a known way, is not shown in the drawing. It contains an arrangement for melting the material to be injected, e.g. artificial resin or a metal having a low melting point, and an arrangement for bringing the molten material under high pressure, said arrangement communicating with the feeding channel leading to the casting space between the mold sections. The injecting mechanism can be connected with the stationary part 7 of the machine carrying the mold section 10.

The mold section 11 is supported by a block 4 that is slidable with respect to the base plate of the machine; this block carries coupling rods 5 adapted to slide with respect to said block. The coupling bars are, at their free ends, provided with clutching claws 6, engaging coupling sleeves 8, which are rotatable with respect to the part 7. By means of a worm drive 9 the coupling sleeves 8 can be rotated in such a manner that they allow the claws 6 of the coupling rods to pass, whereupon these claws can be locked by a rotary movement of the sleeve 8 by means of worm drive 9 in opposite direction.

The block 4 can, together with the coupling rods 5 and the mold section 11, be reciprocated as a whole a long distance by means of a double acting hydraulic cylinder 1, the plunger 12 of which is rigidly connected with the block 4. Each coupling bar is connected with a concentric sleeve 2, cooperating with a sleeve 3 which is rigidly secured to the block 4 and also concentrically applied to the coupling rod 5. In view of the correct adjustment each sleeve 2 can be mounted on the corresponding coupling rod 5 by means of screw thread and be locked e.g. with the aid of a check nut 15 after the correct adjustment has been applied. The sleeves 2 and 3 confine a hydraulic working space 13 for pressing the mold sections and a hydraulic working space 14 for initiating the opening of the mold sections.

Figure 1 shows the machine in opened position. The mold sections 10 and 11 are completely separated and the space between the mold sections is well accessible.

Figure 2 shows the position of the machine after pressure medium has been admitted to the cylinder 1 at the left hand side of the piston for closing the mold sections 10, 11. The clutching claws 6 of the coupling rods 5 have here passed the claws of the sleeves 8.

In Figure 3 the claws have been rotated by means of the worm drive 9, in such a manner, that the coupling mechanism 6, 8 has been brought into the coupled position. Thereupon the sleeves 2 and 3 are moved with respect to each other, so that the working chambers 13 are filled with liquid.

Figure 4 shows the situation during the casting operation by injection of the liquid material. Before this operation the chambers 13 are brought under high pressure,
so that the mold sections 10 and 11 are drawn together under high pressure. It may be remarked in this connection that only relatively short sections of the coupling rods 5 are loaded under strain of tension so that the elastic deformation of these coupling rods is limited.

Figure 5:
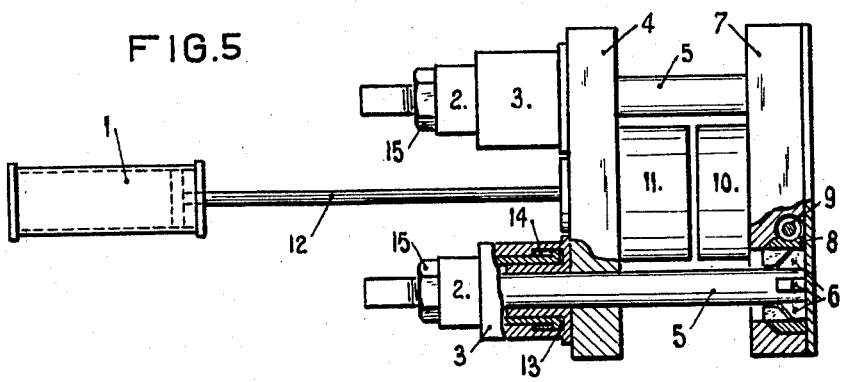

Figure 5 shows the position during the initiation of the opening of the mold sections 10, 11, the working spaces 14 being brought under hydraulic pressure. It may be remarked that the pressures in the various working spaces 13 in the position shown in Fig. 4 may be chosen differently in view of the shape of the casting and its position with respect to the mold sections 10, 11.

Figure 6:
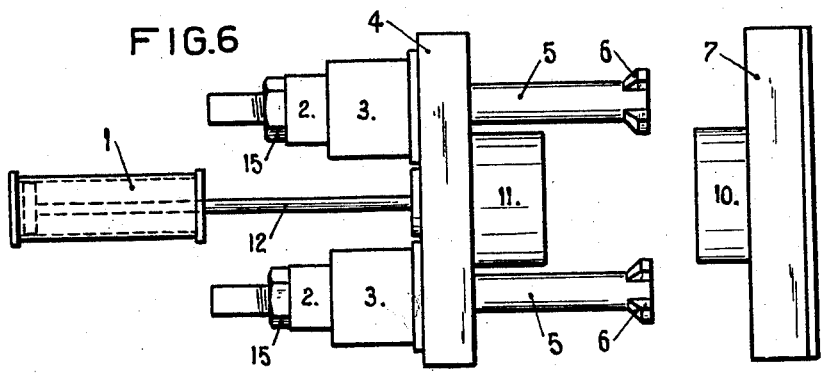

In the position shown in Figure 5, consequently when there is a small clearance between the mold sections 10, 11, the worm drive is actuated once more for disconnecting the coupling mechanism by rotating the coupling sleeves 8. As shown in Figure 6 hydraulic medium is then admitted into the cylinder 1 at the right hand side of the piston, whereby the block 4 and the parts belonging thereto are brought back into the starting position shown in Figure 1. The casting is now removed from the machine. In this state it is also possible to interchange the mold sections 10, 11.

What we claim is:

1. A machine for die casting or injection molding having mold sections, comprising pressure mechanism for drawing the mold sections together, one of said mold sections being slidable with respect to the other, coupling rods carried by said slidable mold sections, said pressure mechanism engaging on the one side said slidable mold section and on the other side said coupling rods, intermediate coupling members, which, on closing or opening said mold sections effect respective coupling and uncoupling between said coupling rods and said other mold section, separate driving mechanisms for actuating said coupling members in unloaded and free condition of said members, a hydraulic cylinder for bringing about movements for the opening or the closing of said mold sections and having a driving rod, said rod engaging one of said mold sections, and separate hydraulic pressure cylinders, each having one of said coupling rods for effecting the driving together of said mold sections.

2. Machine according to claim 1, characterized in that, when the mold sections are being drawn together, various pressures can be supplied to the working spaces of said pressure cylinders belonging to said coupling rods.

3. Machine according to claim 2 wherein said pressure cylinder of each of said coupling rods is constituted by one sleeve, concentric to the coupling rod and rigidly attached to the slidable mold section, and by a second sleeve rigidly secured to the coupling rod, said sleeves enclosing, one hydraulic working space for pressing said mold sections together and a second hydraulic working space for initiating the opening of said mold sections.

4. Machine according to claim 1 wherein said pressure cylinder of each of said coupling rods is constituted by one sleeve, concentric to the coupling rod and rigidly attached to the slidable mold section, and by a second sleeve rigidly secured to the coupling rod, said sleeves enclosing, one hydraulic working space for pressing said mold sections together and a second hydraulic working space for initiating the opening of said mold sections.

References Cited in the file of this patent
UNITED STATES PATENTS

| | | |
|---|---|---|
| 2,319,479 | Ryder | May 18, 1943 |
| 2,370,622 | Gastrow | Mar. 6, 1945 |
| 2,689,978 | Roger | Sept. 28, 1954 |
| 2,711,561 | Studli | June 28, 1955 |